United States Patent
Sparks et al.

(10) Patent No.: US 7,620,322 B2
(45) Date of Patent: Nov. 17, 2009

(54) LOAD SHARING NODES IN A NETWORK UTILISING SHARED OPTICAL PROTECTION

(75) Inventors: Adrian P Sparks, Ongar (GB); Peter Anslow, Bishops Stortford (GB); Peter D Roorda, Ottawa (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 516 days.

(21) Appl. No.: 09/745,890

(22) Filed: Dec. 21, 2000

(65) Prior Publication Data

US 2002/0080437 A1    Jun. 27, 2002

(30) Foreign Application Priority Data

Dec. 23, 1999   (GB)   ................... 9930525.2

(51) Int. Cl.
*H04J 14/00*   (2006.01)
(52) U.S. Cl. .................. 398/49; 398/5; 398/45
(58) Field of Classification Search ......... 398/5, 398/4, 45, 49, 50, 57, 58, 59, 7, 12, 54
See application file for complete search history.

(56) References Cited

U.S. PATENT DOCUMENTS

| | | | | |
|---|---|---|---|---|
| 5,856,974 A * | 1/1999 | Gervais et al. | ............... | 370/392 |
| 5,959,968 A * | 9/1999 | Chin et al. | ................... | 370/216 |
| 6,046,832 A * | 4/2000 | Fishman | ...................... | 398/45 |
| 6,111,877 A * | 8/2000 | Wilford et al. | ............... | 370/392 |
| 6,397,260 B1 * | 5/2002 | Wils et al. | ................... | 709/238 |
| 6,578,147 B1 * | 6/2003 | Shanklin et al. | ............. | 713/200 |
| 6,654,341 B1 * | 11/2003 | Chi et al. | .................... | 370/216 |
| 6,662,308 B1 * | 12/2003 | Baroni et al. | .................. | 714/4 |
| 6,678,474 B1 * | 1/2004 | Masuda et al. | ................. | 398/75 |
| 6,735,392 B1 * | 5/2004 | Elahmadi et al. | .............. | 398/7 |

OTHER PUBLICATIONS

Type and characteristics of SDH network protection architectures ITU-T, G.841 (Oct. 1998).*

* cited by examiner

*Primary Examiner*—Dzung D Tran
(74) *Attorney, Agent, or Firm*—Barnes & Thornburg LLP

(57) ABSTRACT

A method of transmitting packet traffic between first and second network nodes in a shared protection optical transmission network, the method comprising defining first and second traffic paths between said nodes, at least one of said paths being a shared protection path, and allocating traffic along said paths utilising link aggregation.

6 Claims, 4 Drawing Sheets

LOAD SHARING NODES IN A NETWORK UTILISING SHARED OPTICAL PROTECTION

This invention relates to an optical communications network and in particular, to a network in which optical protection paths, which maintain connection between network nodes in the event of a fault in a main working traffic signal path between the nodes, are hared by a number of nodes.

Optical transmission systems are often constructed with a fault recovery mechanism so that if there is a complete loss of transmission capability, e.g. from a break in the fibre, or a failure in the transmission path for any other reason, the traffic can be reallocated to other physically diverse routes.

FIG. 1 shows a typical dedicated protection scheme, in which an additional protection cable 14ab,14cd is provided for each pair of nodes 10a,10b; 10c,10d in addition to the main signal carrying transmission line 12ab, 12cd joining the respective pairs of nodes. As the protection cables 14ab,14cd follow a physically different path around the network to the respective main signal carrying cables 12ab,12cd, this ensures that the protection cable is unlikely to be affected by the same failure as the main cable e.g. due to a worker inadvertently cutting the cable.

In the example shown, the nodes are each represented by routers 10a,10b,10c,10d connected by optical fibre transmission lines 12ab,12cd,14ab,14cd. Routers operate at network layer 3 of the OSI (open systems interconnect) model, and determine the best route to send data. Wavelength converters 21 to 28 are utilised to convert the signals from the relatively short wavelength output by the router to the longer wavelength utilised for transmission, and back once again to the shorter wavelength for reception at the destination router.

Typically, each router pair only transmits data along the working paths e.g. from 10a via 12ab to 10b, with the relevant dedicated protect path 14ab only being utilised in the event of a failure of the main working path. Consequently, this type of dedicated protection scheme results in a large number of additional transmission lines extending around the network, and these are normally unused. This approach is therefore expensive and inherently bandwidth inefficient.

The routers will typically be connected to additional routers within the network, utilising other working and protect paths. Each router typically maintains a router table indicative of the connectivity of each router within the network. In the event of a cable cut in the working path e.g. 12ab, or another situation that requires utilisation of the protection feature, each router table will require updating. This takes a finite time to be initiated and to propagate through the network. Routing table updates are best avoided if possible. They consume router processing resources and can trigger routing instability or "route flapping" (Internet Routing Instability, Labovitz, C Malan, R Jahanian F Proceedings of the ACM SIGCOMM '97).

A known improvement to this approach is an optical shared protection ring, an example of which is shown in FIG. 2. In such a system, the protection ring extends over several nodes in the network. Consequently the single ring effectively replaces several dedicated protection paths. As this protection ring can be shared between multiple protection paths, there is an improvement in bandwidth efficiency over using dedicated paths.

In the example shown, the working path between router 110a and 110b is via optical fibre 112ab, and the path between 110c and 110d is via 112cd. The optical protection ring is provided via optical fibre links 114ab,114bc,114cd and 114da. Wavelength converters 121 to 132 are provided as appropriate or longhaul optical interfaces can be provided at the routers. Items 116a to d represent 2×2 optical switches, with the switch input connected to the respective router and a first output to the working path (112ab,112cd) and a second output connected to the optical shared protection ring via respective optical switch modules (OSM—118a to 118d).

In normal operation, each router pair 110a,110b and 110c, 110d sends traffic via the respective working path; if a break occurs in the respective working path, then the respective optical switch will switch the traffic via the OSM onto the respective protection path along the OSPR, i.e. 114ab or 114cd. If both of the respective working and span protect paths fail, then the OSM will switch the traffic to be routed around the long route of the ring e.g. if protect path 114ab fails, then OSM 118a and OSM 118b will act to route traffic from router 110a to 110b via 114da, 114cd and 114bc.

Such a scheme provides greater network resiliency by providing two alternate protection path routes, although it will be appreciated that the protect path route extending the long way around the ring can only be utilised to transmit data in any given channels for one pair of nodes.

As a number of pairs of nodes may utilise the same optical shared protection ring, the scheme can cut down on the total length of transmission fibre that needs to be laid compared with a dedicated protection scheme.

In common with the dedicated protection scheme, an OSPR may also induce routing instability by requiring the routers to update their routing tables. If identical traffic is carried on both working and protection paths then it may be possible to avoid routing table updates caused by cable or transport equipment failure. However in this case only half the networks capacity is being used in normal operation. If two separate router ports are connected to working and protection paths then any transport layer fault will result in at least one port seeing a loss of connectivity.

It is an object of the present invention to address at least one of the problems of the prior art.

SUMMARY OF THE INVENTION

In a first aspect the present invention provides a network node for an optical communications shared protection scheme network, the network node being arranged to provide optical signals to at least two transmission paths, the node comprising a load sharing router having at least two ports, a first port connected to a working transmission path, and a second port connected to a shared protection path.

Preferably, said shared protection path is a ring, said second port being connected to said ring via an optical switching device arranged to switch signals transmitted to and from the second port in either direction around the ring.

In another aspect, the present invention provides an optical network comprising a plurality of network nodes, each network node being arranged to provide optical signals to at least two transmission paths, the node comprising a load sharing router having at least two ports, a first port connected to a working transmission path, and a second port connected to a shared protection path.

In a further aspect, the present invention provides a method of transmitting packet traffic between first and second network nodes in a shared protection optical transmission network, the method comprising defining first and second traffic paths between said nodes, at least one of said paths being a shared protection path, and allocating traffic along said paths utilising link aggregation.

Preferably, said shared protection scheme is an optical shared protection ring, and wherein in the event of a failure or degradation of said protection path, the protect path is switched to be the other way around the ring.

Preferably, a failure in a transmission path is perceived by the nodes as a reduction in capacity by said nodes.

BRIEF DESCRIPTION OF THE DRAWINGS

Embodiments of the invention will now be described by way of example only with reference to the accompanying drawings in which.

DETAILED DESCRIPTION OF PREFERRED EMBODIMENTS

An ongoing development to router technology is the provision of routers having two or more load sharing ports. Load sharing, also termed link aggregation or trunking, is a technique that allows parallel physical links between switches or between a switch and a server to be used simultaneously, thus multiplying the bandwidth between the devices.

The IEEE has determined that the term "link aggregation" is the generic term for this type of technology, with the IEEE link aggregation standards effort to be called 802.3ad.

Link aggregation is a method of grouping physical link segments of the same media type and speed, and treating them as if they were part of a single, logical link segment. In general, link aggregation provides two important benefits: increased performance and increased resilience. Link aggregation provides cost effective incremental bandwidth between two devices, and offers the potential to multiply aggregate bandwidth. The technique also provides automatic, point to point redundancy between two devices (e.g. switch to switch or switch to server). If a link in a trunk fails, the flows mapped to that link are dynamically reassigned to the remaining links of the aggregated link. The remapping occurs as soon as the switch learns that an individual link has failed. As a result, link aggregation configurations are extremely resilient and fault tolerant.

Link aggregation is traditionally utilised in dedicated point to point protection schemes.

The present invention relates to utilising a link aggregation router as part of a shared optical protection scheme, together with the unexpected benefits that utilising such a technology in such a protection scheme brings.

Figure 1:
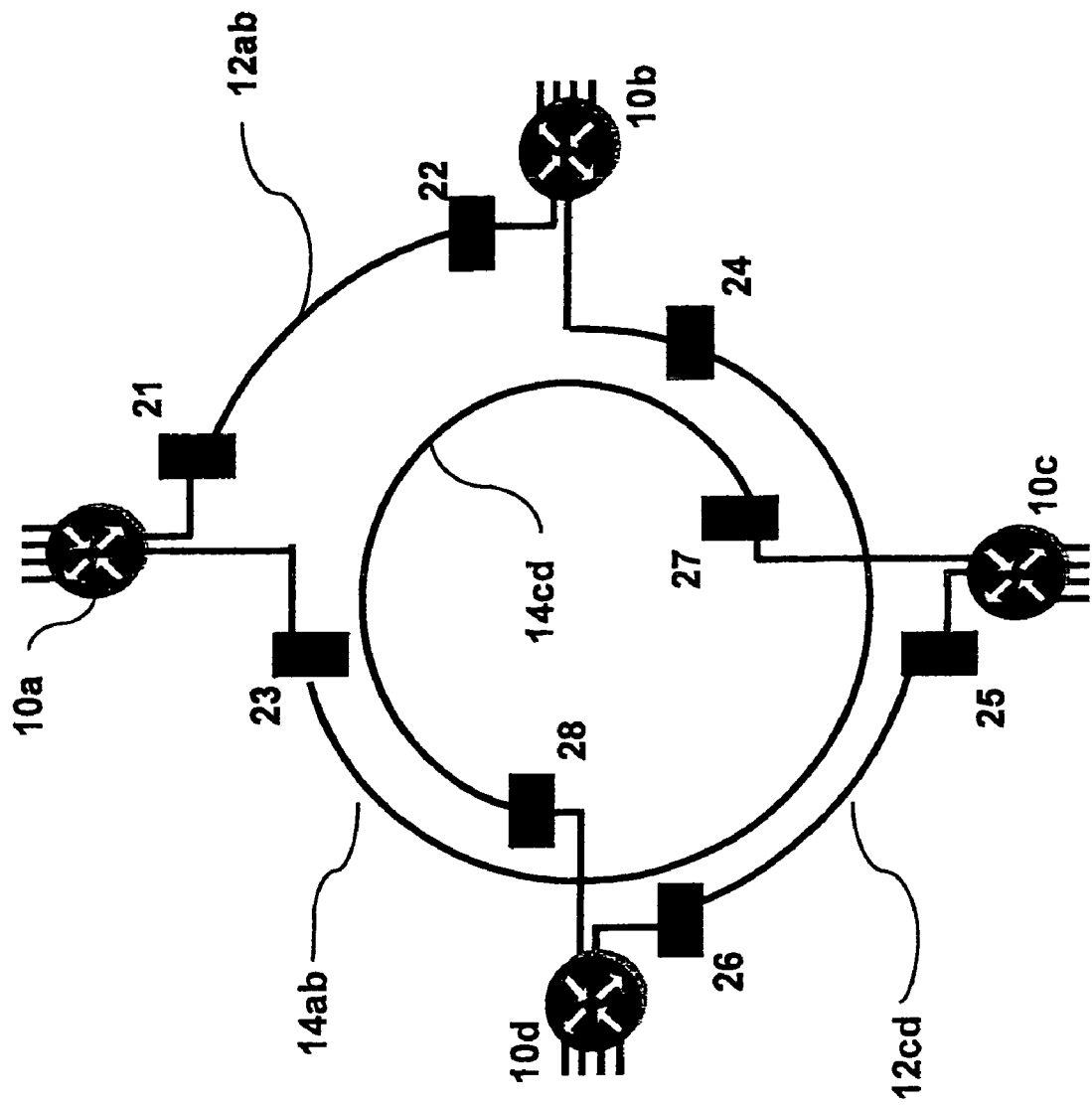
FIG. 1 illustrates a dedicated protection scheme network (prior art)
Figure 2:
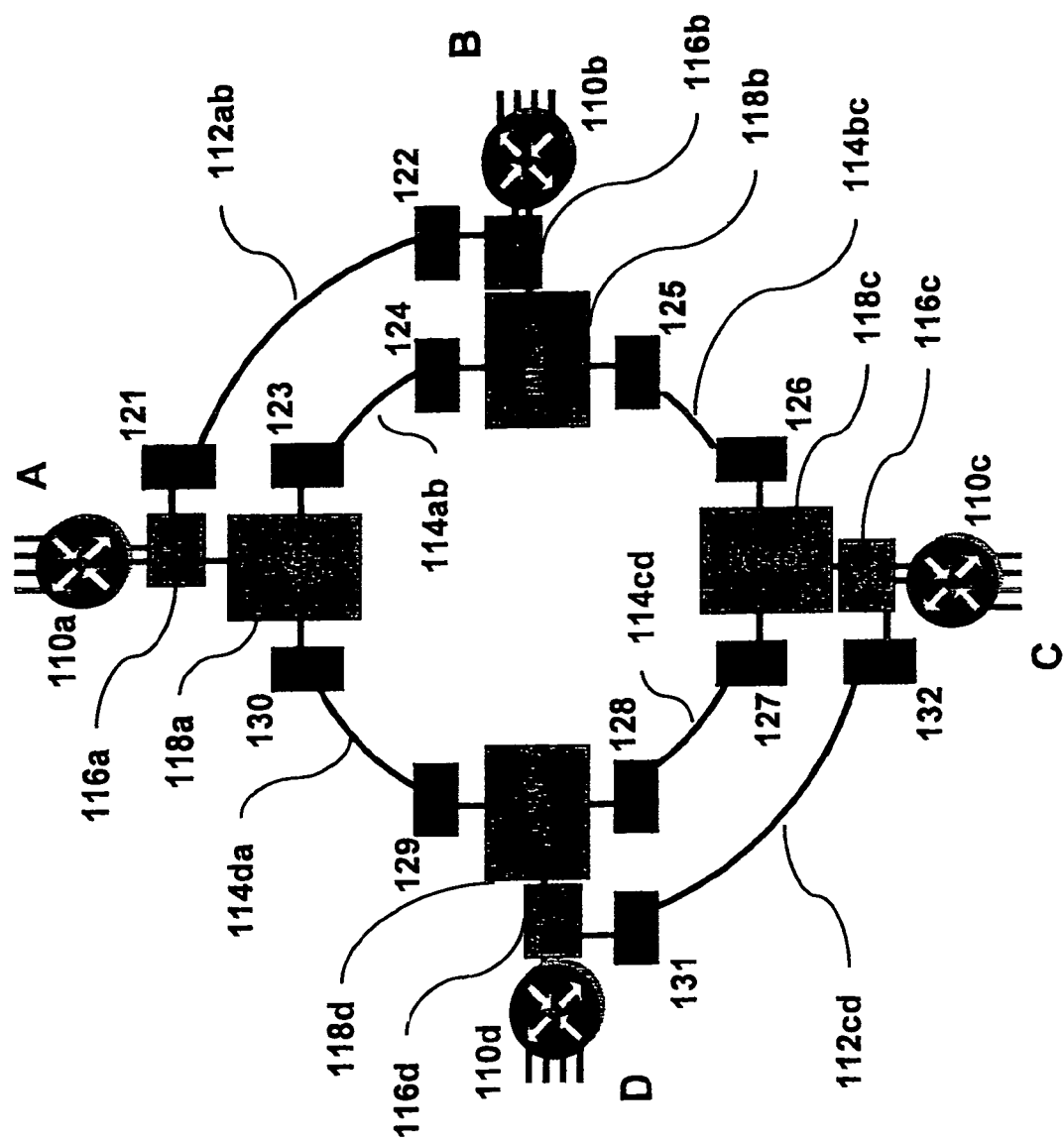
FIG. 2 illustrates an optical shared protection ring network scheme (prior art)

A preferred embodiment of the present invention will now be described with reference to FIG. 3, in which the same references have been used to indicate those devices that occur in the prior art scheme shown in FIG. 2. This scheme connects two pairs of load sharing routers (210a,210b and 210c,210d), which each have respective load sharing ports (216a to 216d). Thus data may be transmitted between sites A and B, and between sites C and D.

For instance, traffic between locations A and B will be transmitted via paths 212ab and 214ab in normal operation. As the routers are loadsharing (provide link aggregation) then the traffic will be sent down either or preferably both of the paths, depending on their availability. If sustained demand is greater than the available capacity, packets will be dropped using information provided by any packet priority scheme in operation.

There is thus no need to pre-sort traffic into protected and unprotected classes for the transmission network, for instance as is described in the co-pending U.S. application Ser. No. 09/206,597, by P J Atterton, assigned to Nortel Networks Corporation. Thus best use can be made of whatever capacity is available. Provided capacity is available on at least one of the paths connected to either of the load sharing ports, the router will not see change in its connectivity, thus avoiding routing table changes which take time to signal and can result in network instabilities.

Figure 3:
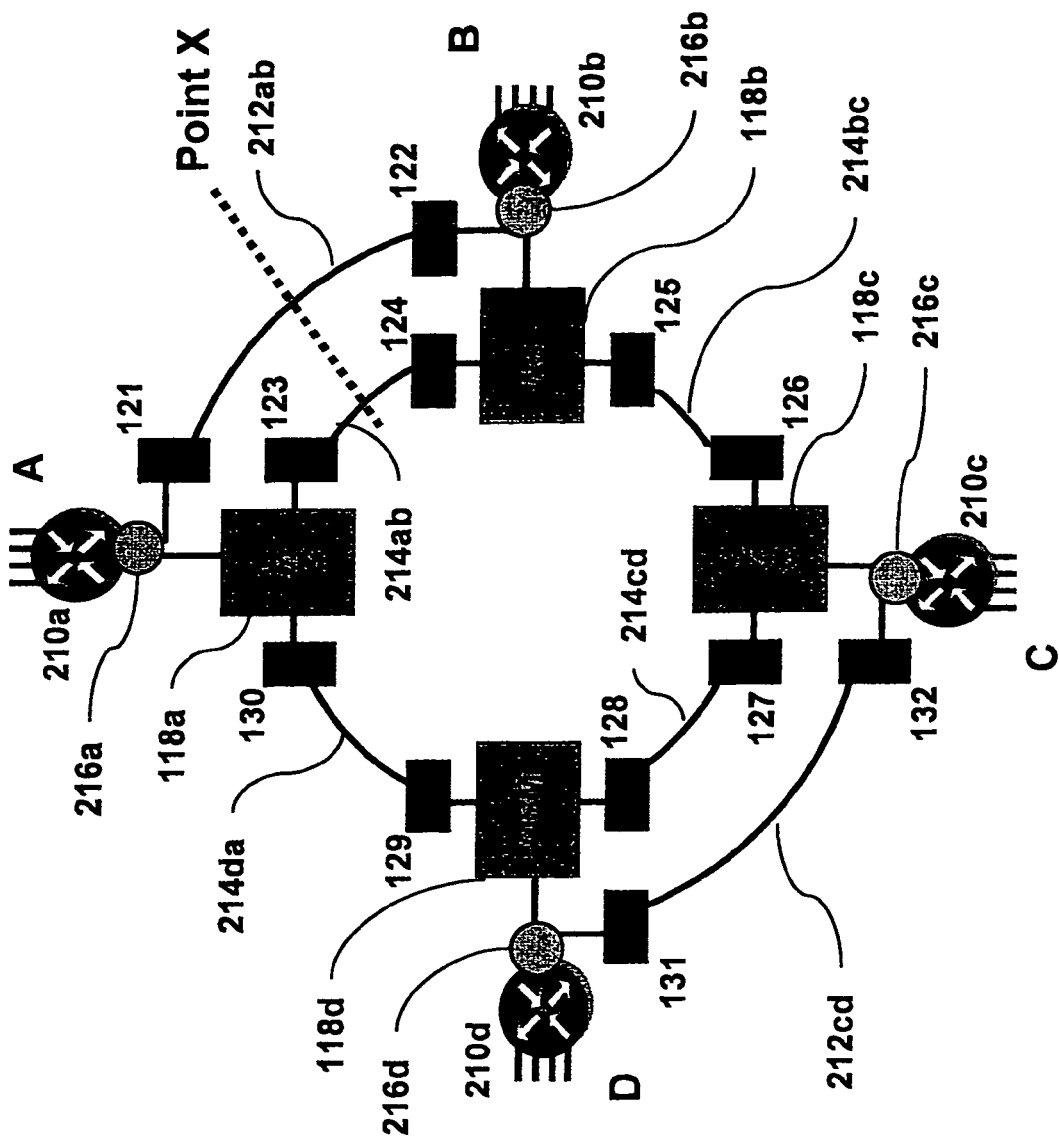
FIG. 3 illustrates an optical shared protection ring implemented according to an embodiment of the invention.

In the event of a failure severing both paths normally carrying traffic, for example at the point X shown in FIG. 3, the protection route is restored by being routed the opposite way around the ring. This restoration occurs relatively quickly, in order that the router is not aware of any short period during which packets cannot travel between the two desired routers (210a and 210b).

In this protection state, only half the bandwidth (as compared to normal operation, assuming similar capacities between each of the paths) can be carried between the two sites (A and B). The decision as to which packets are being dropped is made in the router based on its knowledge of individual packet priorities. All the other devices using the ring shared capacity will also only have available half of the normal bandwidth.

Thus such a protection scheme is relatively quick compared with OSI layer 3 protection, and utilises the shared protection bandwidth efficiently.

Figure 4:
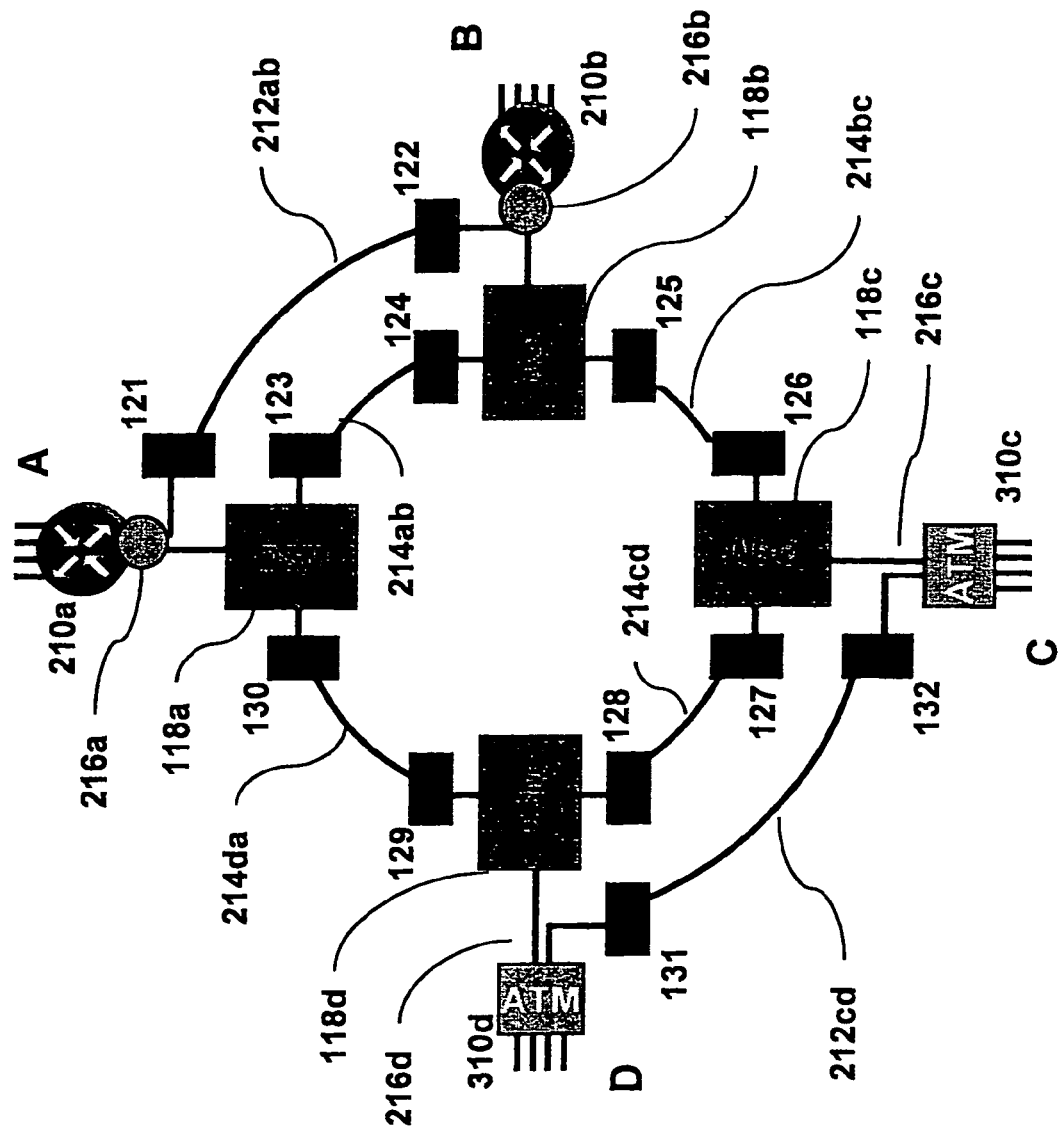
FIG. 4 illustrates an optical shared protection ring implemented according to a further embodiment of the invention.

As each router is only performing a simple load share between two ports it can take account of quality of service. For example, if desired, different service platforms can share the same ring protection channels. This is indicated in FIG. 4, which uses the same reference numerals as FIG. 3 for the same devices, and mixes load sharing routers (210a,210b) with ATM switches (310c,310d) utilising the same protection ring.

The scheme also provides direct access to transport fault detection, reporting and management.

Due to the use of load sharing devices, a failure in one or more of the transmission paths will be perceived by the routers as a change in available bandwidth rather than a change in connectivity. Thus router tables need not be frequently updated, and the condition known as "route flapping" is inhibited from occurring.

Finally, the separation of transport and router layers accommodate different product lives and management, allowing easy replacement or updating of the individual constituents of a layer without significantly impacting the other layers.

For the purposes of this specification, the terms "optical" and "light" should be understood as pertaining not only to the visible part of the spectrum, but also to the infra red and ultra violet parts that bound the visible part.

Whilst the invention has been described with specific types of components it will be appreciated by a skilled person that devices having similar characteristics could be utilised instead. For instance, whilst the invention has been described with respect to optical fibre components, other optical waveguides or even free space transmission paths could equally be used.

The foregoing describes the invention including the preferred form thereof. Alterations and modifications as will be obvious to someone skilled in art are incorporated within the specification hereof.

The invention claimed is:

1. A network node for an optical communications shared protection scheme network, the network node being arranged to provide optical signals to at least two transmission paths, the node comprising a link aggregation router having at least two ports, a first port connected to a working transmission path, and a second port connected to a shared protection path, the link aggregation router being arranged to group physical link segments of the same media type and speed and treat them as part of a single logical link segment so as to provide an aggregated link, and if a link fails, to dynamically reassign flows mapped to that failed link to the remaining links of the aggregated link, wherein in failure-free operation both the working transmission path and the shared protection path carry link aggregated traffic simultaneously without duplication of that traffic on the two routes.

2. A network node as claimed in claim 1, wherein said shared protection path is a ring, said second port being connected to said ring via an optical switching device arranged to switch signals transmitted to and from the second port in either direction around the ring.

3. An optical network comprising a plurality of network nodes, each network node being arranged to provide optical signals to at least two transmission paths, the node comprising a link aggregation router having at least two ports, a first port connected to a working transmission path, and a second port connected to a shared protection path, the link aggregation router being arranged to group physical link segments of the same media type and speed and treat them as part of a single logical link segment so as to provide an aggregated link, and if a link fails, to dynamically reassign flows mapped to that failed link to the remaining links of the aggregated link, wherein in failure-free operation both the working transmission path and the shared protection path carry link aggregated traffic simultaneously without duplication of that traffic on the two routes.

4. A method of transmitting packet traffic between first and second network nodes in a shared protection optical transmission network, the method comprising defining first and second traffic paths between said nodes, said first path being a shared protection path, and said second path being a working transmission path, and allocating traffic along said paths utilising link aggregation to group physical link segments of the same media type and speed and treat them as part of a single logical link segment so as to provide an aggregated link, and if a link fails, to dynamically reassign flows mapped to that failed link to the remaining links of the aggregated link, such that in failure-free operation both the working transmission path and the shared protection path carry link aggregated traffic simultaneously without duplication of that traffic on the two routes.

5. A method as claimed in claim 4, wherein said shared protection scheme is an optical shared protection ring, and wherein in the event of a failure or degradation of said protection path, the protect path is switched to be the other way around the ring.

6. A method as claimed in claim 4, wherein a failure in a transmission path is perceived by the nodes as a reduction in capacity by said nodes.

* * * * *

UNITED STATES PATENT AND TRADEMARK OFFICE
CERTIFICATE OF CORRECTION

PATENT NO.       : 7,620,322 B2           Page 1 of 1
APPLICATION NO. : 09/745890
DATED            : November 17, 2009
INVENTOR(S)      : Sparks et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 858 days.

Signed and Sealed this

Twenty-sixth Day of October, 2010

David J. Kappos
*Director of the United States Patent and Trademark Office*